(12) United States Patent
Hafford-Harris (10) Patent No.: US 12,524,188 B2
(45) Date of Patent: Jan. 13, 2026

(54) INTERACTIVE MULTI-DEVICE CONTENT SHARING SYSTEM BETWEEN TELEVISIONS

(71) Applicant: Lenora Hafford-Harris, Forest Hill, TX (US)

(72) Inventor: Lenora Hafford-Harris, Forest Hill, TX (US)

( * ) Notice: Subject to any disclaimer, the term of this patent is extended or adjusted under 35 U.S.C. 154(b) by 36 days.

(21) Appl. No.: 18/779,332

(22) Filed: Jul. 22, 2024

(65) Prior Publication Data

US 2025/0036348 A1    Jan. 30, 2025

Related U.S. Application Data

(60) Provisional application No. 63/515,438, filed on Jul. 25, 2023.

(51) Int. Cl.
*G06F 3/14* (2006.01)
*H04N 21/422* (2011.01)

(52) U.S. Cl.
CPC ..... *G06F 3/1454* (2013.01); *H04N 21/42204* (2013.01)

(58) Field of Classification Search
CPC ............ G06F 3/1454; H04N 21/41265; H04N 21/42204; H04N 21/43615; H04N 21/43637
See application file for complete search history.

(56) References Cited

U.S. PATENT DOCUMENTS

| | | | |
|---|---|---|---|
| 10,776,068 B2 | 9/2020 | Hong | |
| 2007/0288970 A1 | 12/2007 | Tedenvall | |
| 2013/0091527 A1 | 4/2013 | Ho | |
| 2013/0259256 A1* | 10/2013 | Shen | H04R 1/10 381/74 |
| 2014/0067947 A1 | 3/2014 | Archibong | |
| 2014/0362294 A1* | 12/2014 | Majid | H04N 21/4312 348/564 |
| 2015/0082241 A1 | 3/2015 | Kang | |

* cited by examiner

*Primary Examiner* — Insa Sadio
(74) *Attorney, Agent, or Firm* — Brennan, Manna & Diamond, LLC (57) ABSTRACT

A television content real-time sharing system designed to enable seamless media sharing between at least two televisions is disclosed. The system comprises plug-in devices or a media sharing software application installed on the televisions, connected via a cloud-based linkage server for facilitating wireless transmission of media content, including video, audio, and images. A remote device includes control buttons, including a send button, an open button, and a snap button, used to control the media transmission. In some embodiments, the system supports adaptive streaming, low-latency protocols, and enables real-time annotations, and scheduling of content sharing. The system enhances the viewing experience by enabling content sharing across different locations, ensuring synchronized and high-quality media transmission, and providing interactive features to engage users.

20 Claims, 6 Drawing Sheets

INTERACTIVE MULTI-DEVICE CONTENT SHARING SYSTEM BETWEEN TELEVISIONS

CROSS-REFERENCE TO RELATED APPLICATION

The present application claims priority to, and the benefit of, U.S. Provisional Application No. 63/515,438, which was filed on Jul. 25, 2023, and is incorporated herein by reference in its entirety.

FIELD OF THE INVENTION

The present invention generally relates to the field of television content sharing system. More specifically, the present invention relates to a novel system that enables a user to share content from one TV to a second TV. The system includes a software application or plug-in device for a television that enables a user to send movies, TV shows, commercials, screenshots, etc. from the first TV to the second TV. The system can be used for sharing content between different types of televisions. Accordingly, the present disclosure makes specific reference thereto. Nonetheless, it is to be appreciated that aspects of the present invention are also equally applicable to other like applications, devices, and methods of manufacture.

BACKGROUND

By way of background, many individuals enjoy watching television shows, movies and sporting events with their friends and family. Watching media together enhances the enjoyment of the content and provides an opportunity for social interaction and bonding. However, many TV shows and movies are broadcast at specific times. Live sporting events are also broadcast at specific times. The scheduling at specific times makes it difficult for friends and family members, who may have conflicting schedules or be in different locations, to watch the program together and/or simultaneously. Family members and friends often live in different places, making it challenging to gather in one location to watch TV shows or movies together.

Also, individuals often want to share specific portions or clips of a TV show or movie with their friends and family. Individuals want to share their favorite moments, reactions, or interesting scenes with loved ones. Individuals further desire to interact with each other while watching TV shows or movies. This may involve sharing reactions and engaging in activities related to the content being viewed. Traditional methods such as phone calls or video calls are often inefficient for sharing and live discussing TV shows or movies. Video calls and phone conversations require active participation and attention, which can distract viewers from the content they are watching. There is a need for a system that enables individuals to share and interact with TV content seamlessly, even when they are in different locations.

Therefore, there exists a long felt need in the art for a content sharing system that enables individuals to share media content in real-time between televisions. There is also a long felt need in the art for a content sharing system that enables individuals to share and interact with TV content, even when they are in different locations. Additionally, there is a long felt need in the art for a system that enables users to share TV shows, movies, and other media content across multiple televisions. Moreover, there is a long felt need in the art for a content sharing system between televisions that enhances the shared viewing experience without inefficiencies and distractions associated with traditional communication methods. Further, there is a long felt need in the art for a software application and remote that can share content from one television to a second television. Furthermore, there is a long felt need in the art for a system that enables users to send movies, TV show clips, commercials, screenshots, etc. to their friends and family through the television. Finally, there is a long felt need in the art for a content sharing system that offers a way for individuals to share their favorite shows and movies with their friends.

The subject matter disclosed and claimed herein, in one embodiment thereof, comprises a content sharing system between televisions. The system features a first plug-in device configured to be removably connected to a port of a first television or a software application installed in the television, the first plug-in device or the software application is adapted to transmit media content from the first television. A second plug-in device is configured to be removably connected to a port of a second television or the software application installed in the second television, the second plug-in device or the software application is adapted to receive the media content from the first plug-in device. A remote device is configured to control the transmission of the media content from the first television to the second television, the remote device includes a housing, a send button to initiate the transmission of the media content, and an open button to activate (i.e., actuate) a media sharing application on the first television.

In this manner, the content sharing system of the present invention accomplishes all of the forgoing objectives and provides users with a plug-in device or a software application along with a remote-control device that enable users to easily share movies, TV shows, commercials, and screenshots with friends and family across multiple TVs. The content is synchronized across multiple TVs and a wide range of content can be shared. The system reduces the dependence on phone calls or video calls, minimizing distractions and enabling users to focus on the shared content. The system facilitates live discussions and reactions to shared content, enhancing the social experience without the need for separate communication tools.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a television content real-time sharing system. The system further comprises a first plug-in device configured to be removably connected to a port of a first television, the first plug-in device is adapted to transmit media content from the first television. A second plug-in device is configured to be removably connected to a port of a second television, the second plug-in device is adapted to receive the media content from the first plug-in device. A remote device is configured to control the transmission of the media content from the first television to the second television, the remote device includes a housing, a send button to initiate the transmission of the media content, and an open button to activate (i.e., actuate) a media sharing application on the first television. A cloud-based linkage server is coupled (i.e., wireless communication channel) to the first and second plug-in devices, wherein the cloud-based linkage server facilitates the real-time transmission of the media content between the first television and the second television, enabling for media content sharing across different geographic or physical locations.

In yet another embodiment, a television content real-time sharing system is disclosed. The system includes a media sharing software application installed on a first television and a second television, the software application is adapted to connect with a cloud-based linkage server to enable the transmission of media content from the first television to the second television. A remote device is configured to operate the software application, the remote device includes a send button for initiating the real-time transmission of the media content, an open button to activate (i.e., actuate) the software application on the first television, and a snap button to capture and transmit a snapshot of the media content. A cloud-based linkage server facilitates the real-time transmission of the media content between the first television and the second television.

In another aspect, a method for real-time sharing of television content between a first television and a second television is disclosed. The method includes connecting a first plug-in device to a port of the first television and a second plug-in device to a port of the second television, pairing the first television and the second television wirelessly via a cloud-based linkage server, using a remote device to select and transmit media content from the first television to the second television, wherein the remote device includes a send button for initiating the transmission and an open button for activating a media sharing application on the first television, and adapting the media content on the second television based on the device specifications of the second television. The method also includes the step of scheduling the transmission of media content from the first television to the second television at specified times, using a scheduling feature provided by the media sharing software application.

In another embodiment, the system is configured to support multiple types of media content, including but not limited to video, audio, and image files, and includes an adaptive streaming feature to adjust the quality of the media content based on network conditions.

In another aspect, the media sharing software application includes a user interface that enables users to annotate or highlight portions of the media content, with such annotations or highlights being synchronized in real-time between the first and second televisions.

Numerous benefits and advantages of this invention will become apparent to those skilled in the art to which it pertains upon reading and understanding of the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long felt need in the art for a content sharing system that enables individuals to share media content in real-time between televisions. There is also a long felt need in the art for a content sharing system that enables individuals to share and interact with TV content, even when they are in different locations. Additionally, there is a long felt need in the art for system that enables users to share TV shows, movies, and other media content across multiple televisions. Moreover, there is a long felt need in the art for a content sharing system between televisions that enhances the shared viewing experience without inefficiencies and distractions associated with traditional communication methods. Further, there is a long felt need in the art for a software application and remote that can share content from one television to a second television. Furthermore, there is a long felt need in the art for a system that enables users to send movies, TV show clips, commercials, screenshots, etc. to their friends and family through the television. Finally, there is a long felt need in the art for a content sharing system that offers a way for individuals to share their favorite shows and movies with their friends.

The present invention, in one exemplary embodiment, is a method for real-time sharing of television content between a first television and a second television is disclosed. The method includes connecting a first plug-in device to a port of the first television and a second plug-in device to a port of the second television, pairing the first television and the second television wirelessly via a cloud-based linkage server, using a remote device to select and transmit media content from the first television to the second television, wherein the remote device includes a send button for initiating the transmission and an open button for activating a media sharing application on the first television, and adapting the media content on the second television based on the device specifications of the second television.

Figure 1:
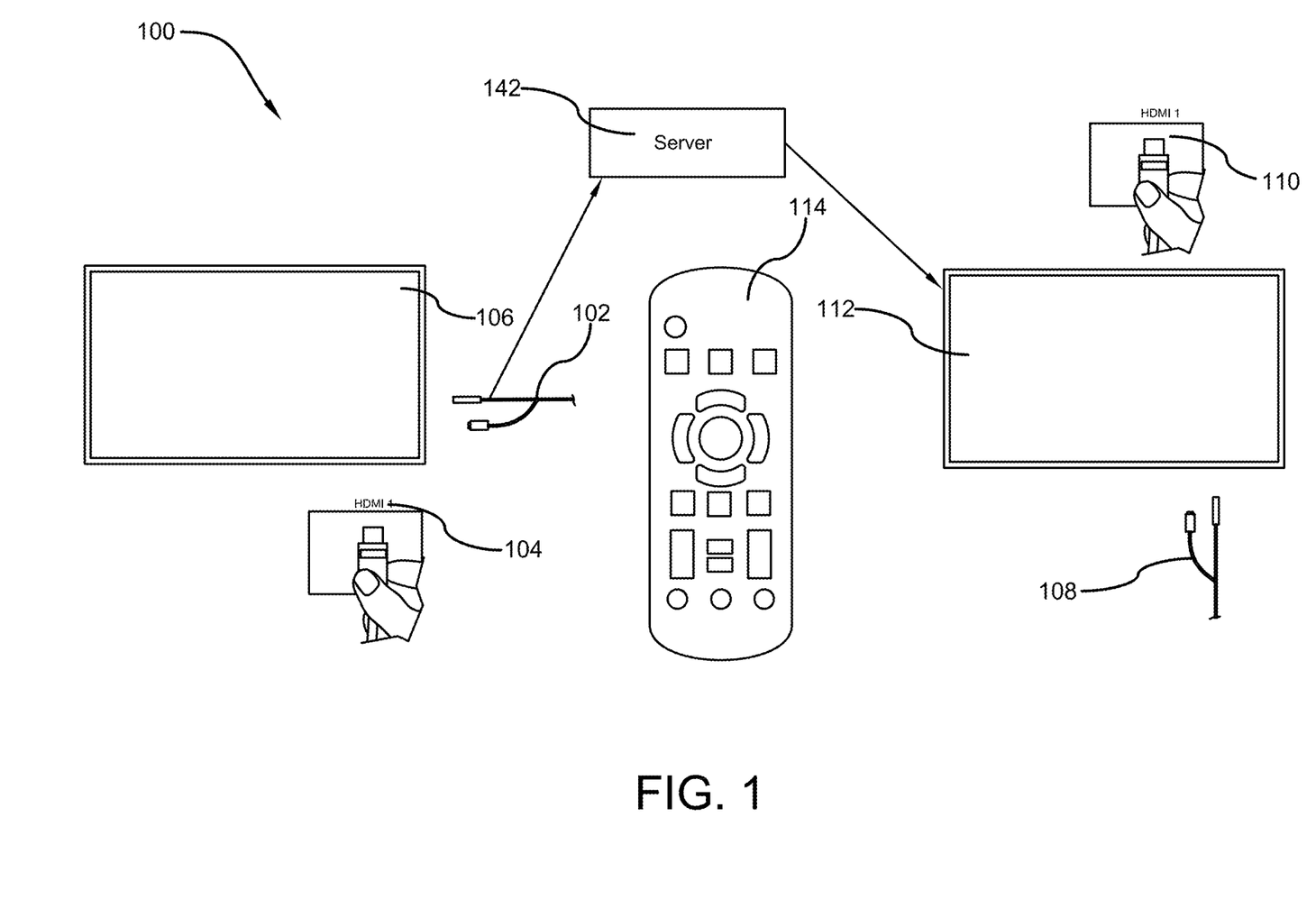
FIG. 1 illustrates a schematic view of one potential embodiment of the television content real-time sharing system of the present invention in accordance with the disclosed structure.

Referring initially to the drawings, FIG. 1 illustrates a schematic view of one potential embodiment of the television content real-time sharing system of the present invention in accordance with the disclosed structure. The television content real-time sharing system 100 is designed to enable users to share content in real-time between at least two televisions. The system 100 enhances the viewing experience of individuals by sharing media across multiple TVs, ensuring that content can be enjoyed seamlessly in different locations within a household or in different cities. More specifically, the system 100 includes a plug-in device 102 adapted to be removably connected to a high-definition multimedia interface (HDMI) or any other similar port 104 of a first television 106. Similarly, a corresponding plug-in-device 108 is connected to the HDMI or similar port 110 of a second television 112. The plug-in-devices 102, 108 enable the first television 106 to wirelessly transfer media content to the second television 112. Any type of media including but not limited to images, videos, and more can be transmitted in real-time between the televisions 106, 112.

Figure 2:
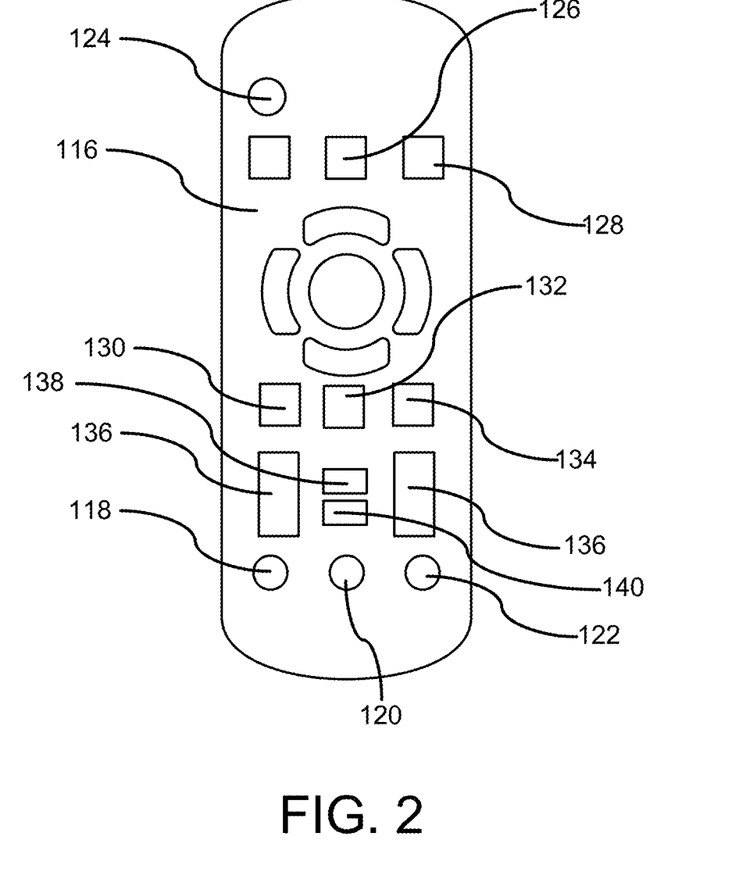
FIG. 2 illustrates an isolated view of one potential embodiment of the remote device in accordance with the disclosed structure.

Referring to FIGS. 1 and 2, the content sharing system 100 includes a remote device 114 for controlling transmission of media between the televisions 106, 112. The remote device 114 is a specially designed hardware device and can couple (i.e., wireless communication channel) to the television 106 via infrared or Bluetooth technology. The remote device 114 includes a housing 116 for storing electronic components required for functionality of the remote device 114.

The remote device 114 includes a send button 118 for real-time transmission of the media from the television 106 to the other television 112. The send button 118 sends an instruction to the plug-in-device 102 to transfer the media from the television 106. An Open button 120 enables a user to activate (i.e., actuate) an application or media on the television 106. The open button 120 in some embodiments can activate the functionality of the plug-in-device 102 for transmission of the media. A snap button 122 when pushed is adapted to take a snapshot of the display of the television 106. The snapshot when taken is sent to the other television 112 either directly or when the send button 118 is pressed.

The remote device 114 also includes conventional buttons for controlling media on the television 106. The conventional buttons may include a power button 124 for activating and deactivating the television 106, a home button 126 for displaying home page of the television 106, and an options button (i.e., functions) 128 for displaying different media transfer options or functions. A rewind button 130, a pause button 132, a fast forward button 134, volume buttons 136, a screen setting button 138, and a mute button 140 provide controlling the media being played on the television 106. It will be apparent to a person skilled in the art that any digital media played on the television 106 can be transmitted in real-time to the other television 112 and the remote device 114 is adapted to work with both the televisions 106, 112, to enable transmission between both the televisions 106, 112. The plug-in device 102, 108 can be designed to be compatible with different types of televisions which can include analog, digital, and smart television.

A cloud-based linkage server 142 is coupled (i.e., wireless communication channel) to the plug-in devices 102, 108 enabling real-time transmission of media between the televisions 106, 112 even when the televisions 106, 112 are at different geographic locations and/or different buildings and beyond the range of short-range communication channel such as Bluetooth. The plug-in devices 102, 108 function as video sharing components and their functionality can be remotely operated using the remote-control device of the corresponding television.

Figure 3:
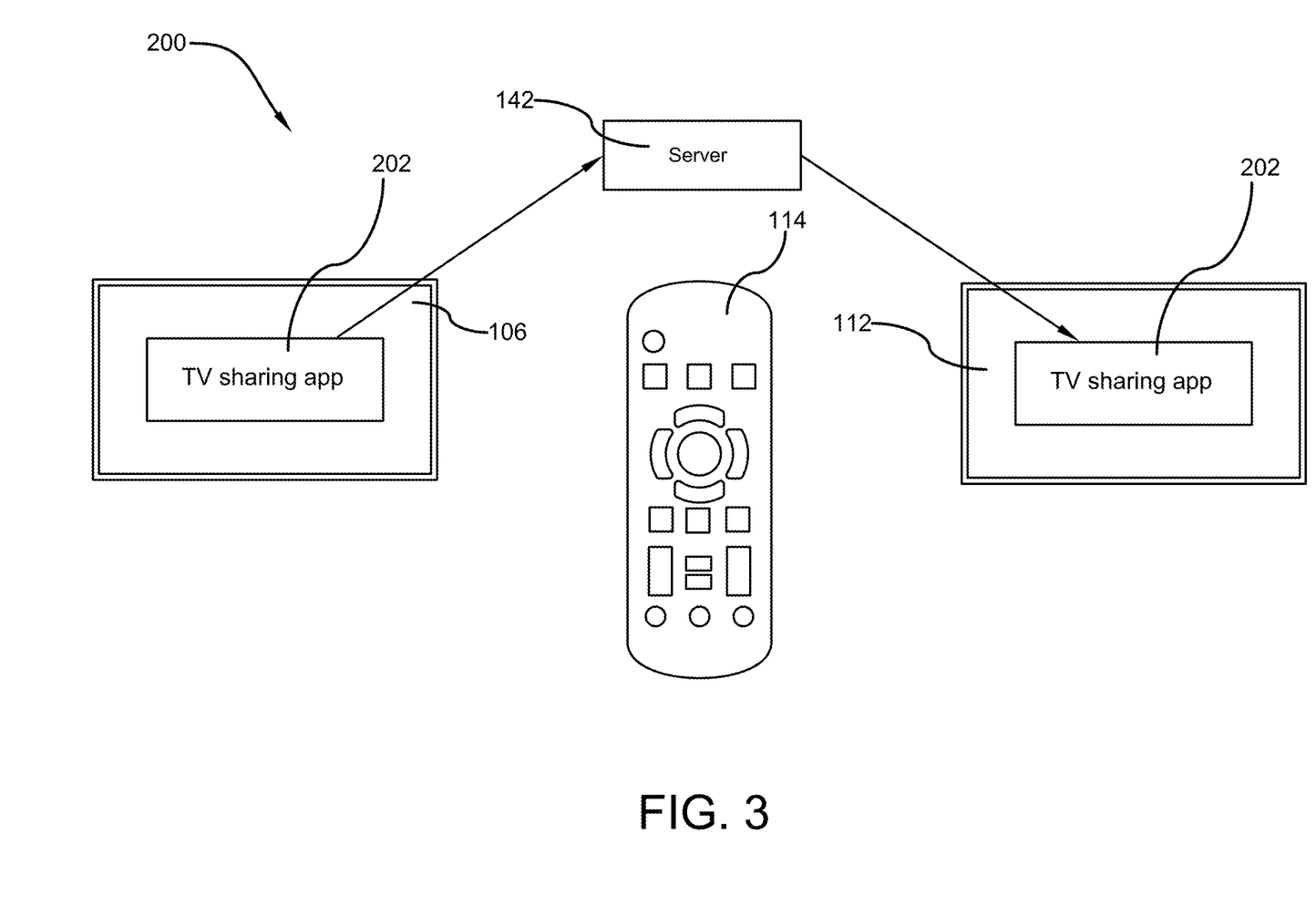
FIG. 3 illustrates a schematic view of another embodiment of the television content real-time sharing system of the present invention in accordance with the disclosed structure.

FIG. 3 illustrates a schematic view of another embodiment of the television content real-time sharing system of the present invention in accordance with the disclosed structure. In the present embodiment, televisions 106, 112 include a media sharing software application 202 installed therein. The software application 202 is adapted to connect with the cloud-based linkage server 142 for enabling transmission of media from one of the televisions to another television.

The remote device 114 is adapted to function with the application 202 and enables a snap button 122 user to transmit media using the control buttons such as send button 118, Open button 120, and snap button 122 as described in FIG. 1. The open button 120 can open the application 202 in the background and the send button 118 can be used for real-time transmission of the media content. The application 202 can be downloaded from an application store in a television or can also come pre-configured in the television. In the present embodiments, use of plug-in devices as described in FIG. 1 is not required and the transmission of media is facilitated by the application 202 via the cloud-based linkage server 142.

It should be noted that in some embodiments of the present invention, other physical device having coupling with the cloud-based linkage server 142 can be used. Such physical devices can include special set-top boxes or other digital video sharing modules which can be physically or wirelessly plugged to the televisions.

Figure 4:
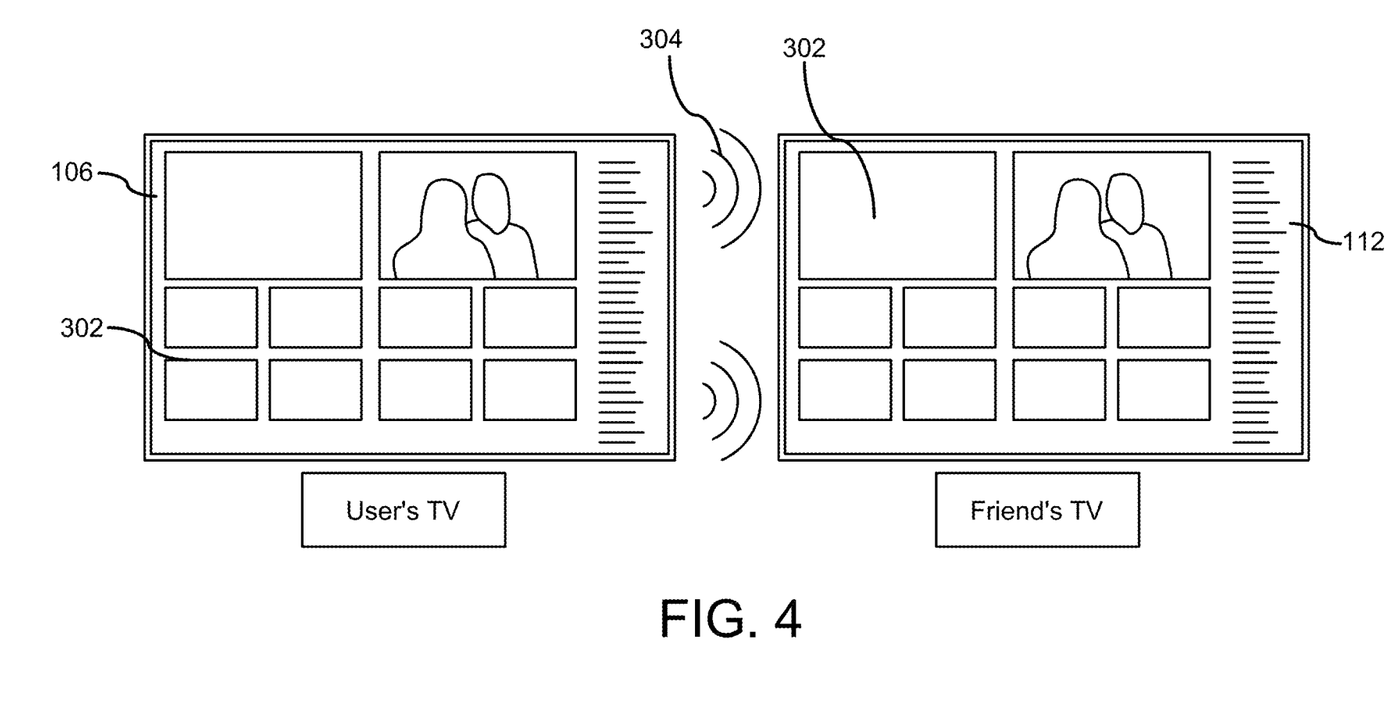
FIG. 4 illustrates a perspective view showing transmission of media from one television to another television in accordance with the disclosed architecture.

FIG. 4 illustrates a perspective view showing transmission of media from one television to another television in accordance with the disclosed architecture. As illustrated, the first television 106 is the transmitting television and the second television 112 is the receiving television. When the remote control 114 is used with the first television 106, then, the real-time media 302 displayed on the first television 106 is transmitted to the second television 112 via the wireless medium 304 which facilitates communication via the cloud-based linkage server 142. The second television 112 displays the common time-shifting video content experience and helps in increasing entertainment and connection between friends and family.

Figure 5:
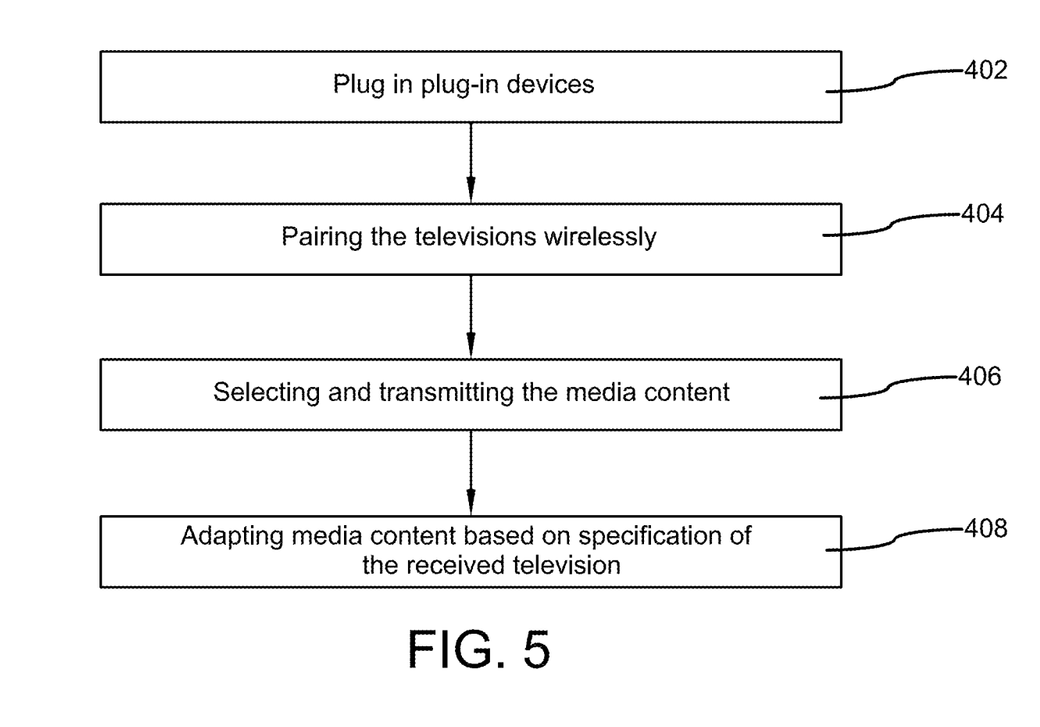
FIG. 5 illustrates a flow chart depicting a process of transmission of media from a first television to a second television in accordance with one embodiment of the present invention.

FIG. 5 illustrates a flow chart depicting a process of transmission of media from a first television to a second television in accordance with one embodiment of the present invention. Initially, the plug-in device is plugged into both of the televisions using HDMI, USB, or any other port (Step 402). Then, the televisions are paired wirelessly either directly using the short-range communication channel or via the cloud-based linkage server 142 (Step 404). Thereafter, the remote control is used for selecting and transmitting the media content from the transmitting television to the receiving television (Step 406). The plug-in device of the receiving television adapts the media content based on the device specification such as display size, resolution rate, playback speed, and more of the receiving television (Step 408).

The system 100 can be used for transmitting media to multiple TVs, enhancing the viewing experience across different rooms and with different friends. The system 100 combines both hardware and software components to provide a seamless and user-friendly experience.

Figure 6:
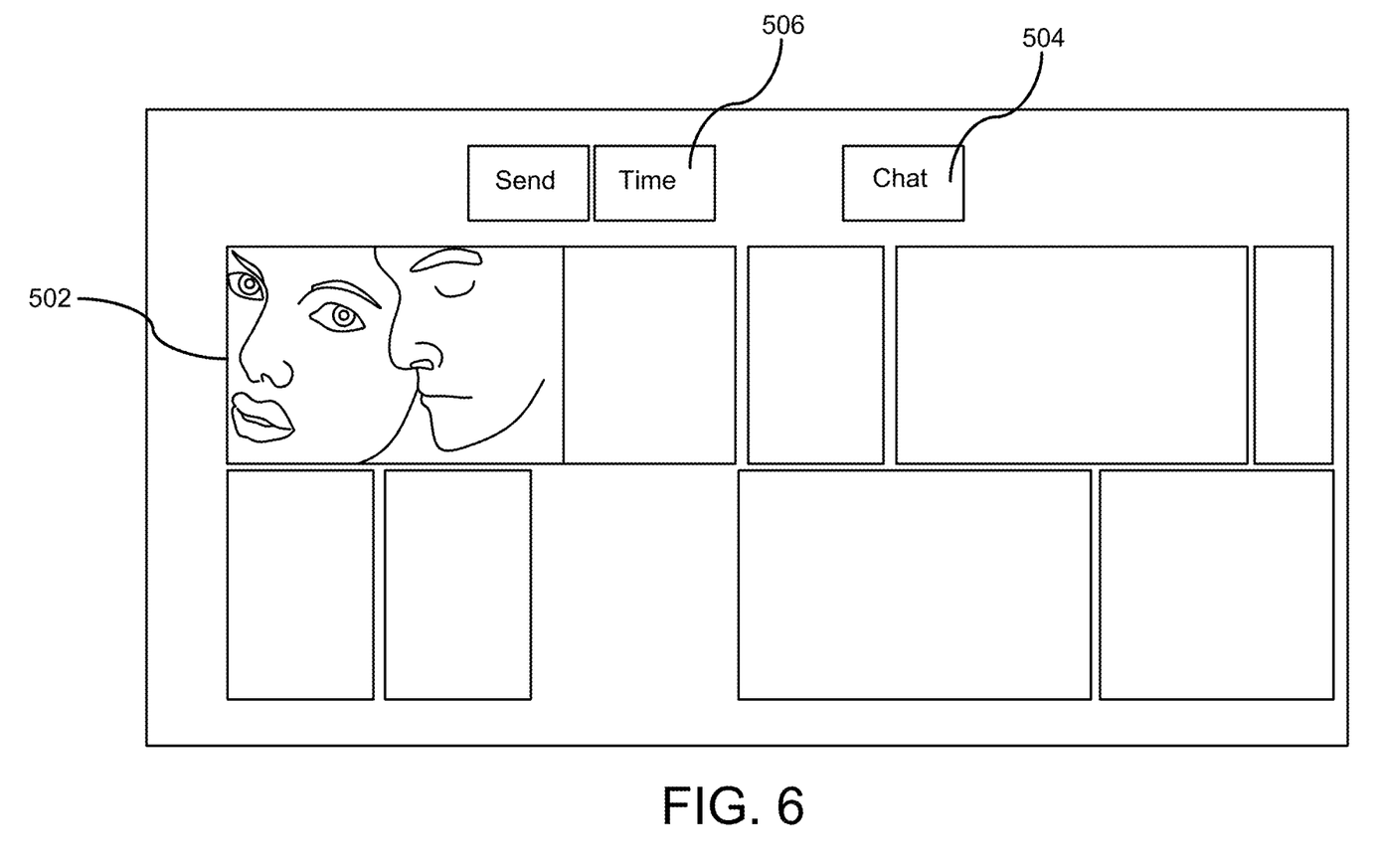
FIG. 6 illustrates an exemplary user interface displayed by the system on at least one television in accordance with one embodiment of the present invention.

FIG. 6 illustrates an exemplary user interface displayed by the system 100 on at least one television in accordance with one embodiment of the present invention. In the present embodiment, the remote device 114 enables a user to annotate or highlight at least a portion 502 of the media and the highlight or annotation is synchronized in real-time between the televisions. The interface 500 also displays a chat box 504 enabling users on the synced televisions to chat in real time. A time option 506 enables users to schedule content sharing between the coupled televisions at specific times and is useful for users to share and watch sports events, shows, and more together.

The system 100 may implement adaptive streaming technology to adjust the quality of the shared content based on network conditions. Further, low-latency protocols may be used to minimize latency in content transmission. The system 100 supports cross-platform support between different operating systems and TV brands. TV consumers are able to save their contents to view at a later time.

The system 100 of the present invention can be used for different purposes including but not limited to virtual classroom integration enabling teachers to share content across multiple screens in a classroom or remote learning environment, corporate use such as for sharing presentations and documents across multiple screens, content streaming sharing, and more.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "television content real-time sharing system", "wireless content sharing between televisions", "interactive multi-device content sharing system between televisions", and "system" are interchangeable and refer to the interactive multi-device content sharing system between televisions 100, 200 of the present invention.

Notwithstanding the forgoing, the interactive multi-device content sharing system between televisions 100, 200 of the present invention can include any additional components to enhance the functionality and efficiency of the interactive multi-device content sharing system between televisions 100, 200. One of ordinary skill in the art will appreciate that the configuration and components of the interactive multi-device content sharing system between televisions 100, 200, as shown in the FIGS., are for illustrative purposes only, and that many other configurations and components are well within the scope of the present disclosure.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A television content real-time sharing system comprising:
    a first television;
    a second television;
    a first plug-in device;
    a second plug-in device;
    a wireless communication channel; and
    a remote device;
    wherein said first plug-in device removably connected to an HDMI port of said first television;
    wherein said second plug-in device removably connected to an HDMI port of said second television;
    wherein said first plug-in-device wirelessly transfers media content through said wireless communication channel from said first television to said second plug-in device and said second television;
    wherein said media content is selected from the group consisting of an image and a video;
    wherein said wirelessly transfers media is in real-time between said first television and said second television; and
    further wherein said remote device controls transmission of said media content, said first television, and said second television.

2. The television content real-time sharing system of claim 1, wherein said wireless communication channel is Bluetooth.

3. The television content real-time sharing system of claim 2, wherein said remote device having a send button for real-time said transmission of said media content from said first television to said second television.

4. The television content real-time sharing system of claim 3, wherein said remote device having one or more functions selected from the group consisting of a rewind button, a pause button, a fast forward button, a volume button, a screen setting button, and a mute button.

5. The television content real-time sharing system of claim 4, wherein said remote device controlling said first television and said second television.

6. The television content real-time sharing system of claim 1, wherein said wireless communication channel is a cloud-based linkage server.

7. The television content real-time sharing system of claim 1, wherein said first television and said second television are in different geographic locations.

8. The television content real-time sharing system of claim 7, wherein said first television and said second television are in different buildings.

9. A television content real-time sharing system comprising:
    a first television;
    a second television;
    a first plug-in device;

a second plug-in device;
a wireless communication channel;
a media sharing software application; and
a remote device;
wherein said first plug-in device removably connected to an HDMI port of said first television;
wherein said second plug-in device removably connected to an HDMI port of said second television;
wherein said first plug-in-device wirelessly transfers media content through said wireless communication channel from said first television to said second plug-in device and said second television;
wherein said media content is selected from the group consisting of an image and a video;
wherein said wirelessly transfers media is in real-time between said first television and said second television;
wherein said remote device controls transmission of said media content, said first television, and said second television;
wherein said wireless communication channel is a cloud-based linkage server; and
further wherein said media sharing software application connected to said cloud-based linkage server.

10. The television content real-time sharing system of claim 9, wherein said remote device having a send button for real-time said transmission of said media content from said first television to said second television.

11. The television content real-time sharing system of claim 10, wherein said remote device having one or more functions selected from the group consisting of a rewind button, a pause button, a fast forward button, a volume button, a screen setting button, and a mute button.

12. The television content real-time sharing system of claim 11, wherein said remote device controlling said first television and said second television.

13. The television content real-time sharing system of claim 12, wherein said first television and said second television are in different geographic locations.

14. The television content real-time sharing system of claim 13, wherein said first television and said second television are in different buildings.

15. A method of sharing real-time content between televisions, the method comprising the steps of:

providing a first television, at least a second television, a first plug-in device, a second plug-in device, a wireless communication channel, a media sharing software application, and a remote device;
connecting said first plug-in device to an HDMI port of said first television;
connecting said second plug-in device to an HDMI port of said at least second television;
wirelessly transferring media content from said first plug-in-device through said wireless communication channel from said first television to said second plug-in device and said at least second television; wherein said media content is selected from the group consisting of an image and a video; and
transferring in real-time said media content between said first television and said at least second television; wherein said remote device controls transmission of said media content, said first television, and said at least second television; wherein said wireless communication channel is a cloud-based linkage server; and further wherein said media sharing software application connected to said cloud-based linkage server.

16. The method of sharing real-time content between televisions of claim 15, wherein said remote device having a send button for real-time said transmission of said media content from said first television to said at least second television.

17. The method of sharing real-time content between televisions of claim 16, wherein said remote device having one or more functions selected from the group consisting of a rewind button, a pause button, a fast forward button, a volume button, a screen setting button, and a mute button.

18. The method of sharing real-time content between televisions of claim 17, wherein said remote device controlling said first television and said at least second television.

19. The method of sharing real-time content between televisions of claim 18, wherein said first television and said at least second television are in different geographic locations.

20. The method of sharing real-time content between televisions of claim 19, wherein said first television and said at least second television are in different buildings.

* * * * *